United States Patent
Bodkin et al.

(10) Patent No.: US 8,154,732 B2
(45) Date of Patent: Apr. 10, 2012

(54) MULTIBAND SPATIAL HETERODYNE SPECTROMETER AND ASSOCIATED METHODS

(75) Inventors: Andrew Bodkin, Wellesley, MA (US); Andrew I. Sheinis, Madison, WI (US)

(73) Assignee: Bodkin Design and Engineering, LLC, Newton, MA (US)

( * ) Notice: Subject to any disclaimer, the term of this patent is extended or adjusted under 35 U.S.C. 154(b) by 861 days.

(21) Appl. No.: 12/111,108

(22) Filed: Apr. 28, 2008

(65) Prior Publication Data

US 2010/0321688 A1 Dec. 23, 2010

Related U.S. Application Data

(60) Provisional application No. 60/914,618, filed on Apr. 27, 2007.

(51) Int. Cl.
*G01B 9/02* (2006.01)
*G01J 3/45* (2006.01)

(52) U.S. Cl. .......................... 356/484; 356/451

(58) Field of Classification Search .............. 356/328, 356/451, 455, 456, 484, 488, 521
See application file for complete search history.

(56) References Cited

U.S. PATENT DOCUMENTS

| | | | |
|---|---|---|---|
| 3,698,812 A | 10/1972 | Nelson | |
| 4,175,844 A | 11/1979 | Glaser-Inbari | |
| 4,561,775 A | 12/1985 | Patrick et al. | |
| 4,708,420 A | 11/1987 | Liddiard | |
| 4,754,139 A | 6/1988 | Ennulat et al. | |
| 5,136,312 A | 8/1992 | Weaver et al. | |
| 5,191,469 A | 3/1993 | Margolis | |
| 5,239,179 A | 8/1993 | Baker | |
| 5,583,340 A | 12/1996 | Grossman | |
| 5,763,882 A | 6/1998 | Klapper et al. | |
| 5,825,029 A | 10/1998 | Agnese et al. | |
| 5,841,574 A | 11/1998 | Willey | |
| 5,877,500 A | 3/1999 | Braig et al. | |
| 6,362,872 B1 | 3/2002 | Berdanier | |
| 6,549,828 B1 | 4/2003 | Garrot et al. | |
| 6,665,116 B1 | 12/2003 | Harvey et al. | |
| 6,781,127 B1 | 8/2004 | Wolff et al. | |
| 7,242,478 B1 * | 7/2007 | Dombrowski et al. | 356/419 |
| 7,456,957 B2 * | 11/2008 | Everett et al. | 356/328 |

(Continued)

OTHER PUBLICATIONS

Milligan, Scott et al. "Optical design of an imaging spatial heterodyne infrared spectrometer". Part of the SPIE Conference on Infrared Technology and Applications XXV, SPIE vol. 3698, Apr. 1999, pp. 869-881.*

(Continued)

*Primary Examiner* — Michael A Lyons
(74) *Attorney, Agent, or Firm* — Latrop & Gage LLP

(57) ABSTRACT

A multiband spatial heterodyne spectrometer for determining spectra in first and second wavelength bands has a beam splitter configured to split incident light and to direct the incident light upon a first and a second diffraction grating. The gratings are configured for Littrow reflection of incident light of the first wavelength band at a first order and Littrow reflection of incident light of the second wavelength band at a second order. Light reflected by the first and the second diffraction grating forms diffraction patterns that are imaged by an electronic camera. A dispersive device such as a prism or diffraction grating separates the imaged interference patterns onto separate rows of pixel sensors corresponding to the wavelength bands. A processing device receives information from the detector and computes spectra therefrom. In embodiments, the spectrometer is configured to compute hyperspectral images of a target.

18 Claims, 8 Drawing Sheets

U.S. PATENT DOCUMENTS

| | | |
|---|---|---|
| 2001/0045516 A1 | 11/2001 | Emanuel et al. |
| 2002/0180866 A1 | 12/2002 | Monroe |
| 2004/0090623 A1 | 5/2004 | Richman |
| 2004/0119020 A1 | 6/2004 | Bodkin |
| 2004/0238724 A1 | 12/2004 | Moody et al. |
| 2005/0023445 A1 | 2/2005 | Horn et al. |
| 2006/0208193 A1 | 9/2006 | Bodkin |
| 2008/0088840 A1 | 4/2008 | Bodkin et al. |

OTHER PUBLICATIONS

Powell, Ian et al. "Performance Comparison of an Anamorphic Spatial Heterodyne Spectrometer with Conventional Spectrometer". International Optical Design Conference, Jun. 4, 2006, pp. 1-3.*

Sheinis, A.I. et al., "Integral Field Unit for the Echellete Spectrograph and Imager at Keck II", 4841 Proc. of SPIE, 1078-85 (2003).

Bacon R., et al., "3D Spectrography at High Spatial Resolution", 113 Astron. Astrophys. Suppl. Ser. 347-57 (1995).

Goetz, A.F.H. et al., Imaging Spectrometry for Earth Remote Sensing, Science, New Series, vol. 228, No. 4704 (Jun. 7, 1985), pp. 1147.

Content, R., "New Design for Integral Field Spectroscopy with 8-m Telescopes", 2871 Proc. of SPIE 1295-1305 (1997).

Martini et al., "Geological and geo-botanical characterization of a hydrothermal system using hyperspectral imagery analysis", 1 Proc. of the Thirteenth International Conference, Applied Geologic Remote Sensing, 337-341 (1999).

Sheinis, A.I.. et al., "ESI, a new Keck Observatory echellette spectrograph and imager", 114 Pub. Of Astronomical Society of the Pacific, 851-865 (2002).

Bach, "Atmospheric Correction of Hyperspectral Data in Terms of the Determination of Plant Parameters", 2318 Proc. of SPIE, 52, 1994.

Esplin et al., "SABER Instrument Design Update", 2553 Proc. of SPIE, 253-63 (1995).

Cayla et al., "IASA Instrument Overview", 2553 Proc. of SPIE, 316-328 (1995).

Kailey. W.F., et al., "Use of Hyperspectral Imagery for Broad-Area Detection of Small Targets", 2819 Proc, of SPIE, 15-23 (1996).

Willoughby, C.T. et al., "Application of Hyperspectral Imaging Spectrometer Systems to Industrial Inspection", 2599 Proc. of SPIE, 264, 1996.

Eismann, M.T. et al, "Target Detection in Desert Backgrounds", 2561 Proc. of SPIE, 80, 1995.

Bacon et al., "The Integral Field Spectrograph TIGER", 1988 vltt. Conf. 1185B.

Murguia, J.E. et al., "A Compact Visible/Near-infrared Hyperspectral Imager", 4028 Proc SPIE 457-468 (2000).

Ewing, B., et al., "Spectrometer Performance Comparison for the Characterization of Transient Events", obtained from link on internet archive dated Oct. 18, 2003, 8 pages.

Opto-Knowledge Systems, Inc. (2003) Website, http://www.techexpo.com/WWW/opto-knowledge/projmwlw4d-is.html; obtained from internet archive dated Aug. 5, 2004, 2 pages.

Vanderriest, C. et al., "Astronomical uses of integral field spectrography: present applications at CFHT and future developments", 2198 SPIE 1376-1384 (1994).

Xing, Y. et al., "Hyperspectral Image Analysis using ENVI", 4383 Proc SPIE 79-86 (2001).

Sheinis et al., "Performance Characteristics of the new Keck Observatory echelle spectrograph and imager", 4008 Proc. SPIE, 522-533 (2000).

Fransden et al. "An Astronomical Seismometer", 279 Astron. Astrophys. 310-321 (1993).

* cited by examiner

US 8,154,732 B2

MULTIBAND SPATIAL HETERODYNE SPECTROMETER AND ASSOCIATED METHODS

RELATED APPLICATIONS

This application claims the benefit of priority to U.S. Provisional Patent Application Ser. No. 60/914,618, filed Apr. 27, 2007, and is incorporated by reference herein.

U.S. GOVERNMENT RIGHTS

This invention was made with Government support under Contract No. HQ0006-06-C-7411 awarded by the Missile Defense Agency of the Department of Defense. The Government has certain rights in this invention.

BACKGROUND

Hyperspectral imaging usually incorporates division of the electromagnetic spectrum into many separate wavelength bands, which may be located in the infrared, visible, or ultraviolet regions. Images are obtained in which each spatial location contains spectral information that is useful in a number of fields. In particular, each wavelength band may carry different or additional information. Thus high resolution spectral information in combination with the spatial information is suitable for identification of chemical species, and objects by their chemical make up.

Civilian applications of hyperspectral imaging include weather observation, measurement of oxygenation patterns in tissues, geological mapping, industrial process control, and astronomy. Specific military applications include target identification, including discrimination of target simulators from real targets, and assessment of target destruction. Target identification, target discrimination, and assessment of target destruction are all of use in missile systems.

Some chemical targets have telltale spectral feature that require very high resolution spectroscopy to identify, and with spectral peaks located octaves apart in wavelength. Typically these spectra can be measured with a Fourier transform infrared spectrometer (FTIR). However, this scanning device takes minutes to gather the data. Slit spectrometer can be used for this purpose but their throughput is low, they can be very large, and their spectral coverage is limited to a single octave.

Spatial Heterodyne Spectrometers (SHS) are typically spectrometers capable of observing spectra of light radiated from or reflected by a target in a narrow band of wavelengths.

Spatial heterodyne spectrometers have also been known as Heterodyned Holographic Spectrometers, as for example in "An Astronomical Seismometer", Frandsen et. al, Astron. Astrophys. 279 310-321, 1993. In this article, Frandsen et. al describe a single-band SHS operating at a single diffraction grating order but having a post-dispersion grating for isolating spectral lines near the center wavelength of the spectrometer.

SUMMARY

A multiband spatial heterodyne spectrometer for determining spectra of incident light in first and second wavelength bands has a beam splitter configured to split incident light and to direct the incident light upon a first and a second diffraction grating. The gratings are configured for Littrow reflection of incident light of the first wavelength band at a first order and Littrow reflection of incident light of the second wavelength band at a different order. Light reflected by the first and the second diffraction grating forms interference patterns that are imaged by an electronic camera. A dispersive device such as a prism or diffraction grating separates the imaged interference patterns onto separate rows of pixel sensors corresponding to the first and second wavelength bands. A processing device receives information from the detector and computes spectra therefrom. This technique can be made to apply to more than two different orders.

DETAILED DESCRIPTION OF INVENTION

An improvement in hyperspectral spectrometers and hyperspectral imaging is the Spatial Heterodyne Spectrometer disclosed herein, (SHS) that can provide very high resolution in a very small package, and can measure spectra in a fraction of a second over a wide bandwidth. The SHS offers very high resolution over a small spectral range. The innovation shown here allows the SHS to operate over a much larger spectral range than with prior instruments, spanning multiple octaves. This device is the Multiband Spatial Heterodyne Spectrometer (MSHS). This new device can seek for many more telltale signature peaks than prior instruments, greatly increasing the likely hood of accurate chemical identification. Such a spectrometer has been adapted to hyperspectral imaging.

Figure 1:
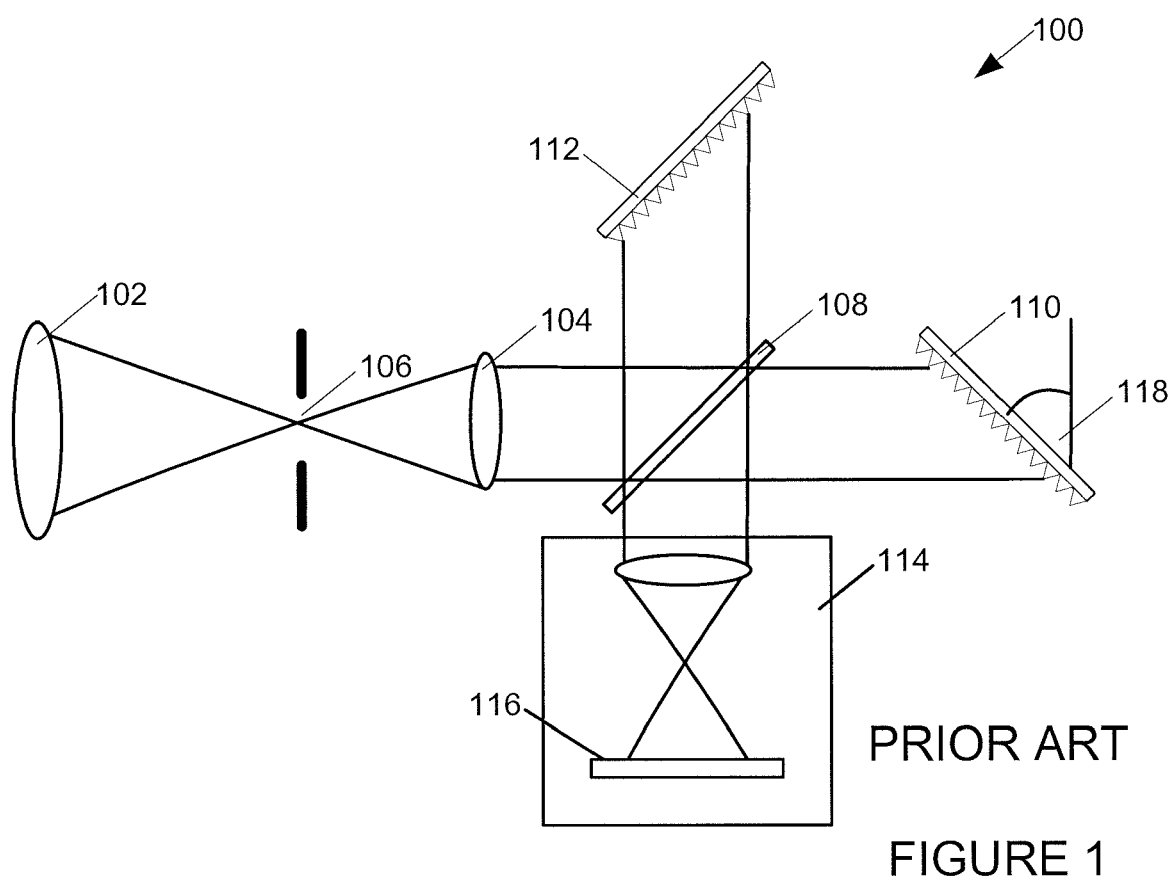
FIG. 1 is a block diagram of a spatial heterodyne spectrometer as known in the art.

A prior art spatial heterodyne spectrometer 100 (SHS) is illustrated in FIG. 1. In spectrometer 100, light enters through a lens 102, 104 and aperture 106 system. The light impinges upon a beam splitter 108. A portion of the light passes through beam splitter 108 and is reflected by a first diffraction grating 110. A second portion of the light is reflected by beam splitter 108 and is reflected by a second diffraction grating 112. A portion of light from the first diffraction grating 110 is reflected by the beam splitter 108 through an interference zone into a camera 114. A portion of light from the second diffraction grating 112 passes through beam splitter 108 through the interference zone into the electronic camera 114. Since the light from first grating 110 and second grating 112 have differing wavefront angles, and these wavefront angles vary with wavelength because of wavelength-dependent diffraction by the gratings 110, 112, an interference pattern is created in the interference zone. Camera 114 provides an image of this interference pattern on a detector 116 having a linear array of pixel sensors, a transform of this pattern may be performed by a digital signal processor to provide a spectrum of light near a diffraction-grating-pitch-and-angle-dependent center wavelength. In spectrometer 100, detector 116 may be a two-dimensional detector array, but this does not significantly broaden bandwidth.

The spectrometer of FIG. 1 tends to have a narrow bandwidth centered upon a wavelength where Littrow diffraction occurs—the wavelength, dependent upon the pitch of the grating 110 and the angle 118 at which the grating is set where incident light is reflected in the direction from which it came. The bandwidth of the instrument is limited in part by resolution of the camera 114.

Light diffracted by a diffraction grating typically gives multiple spectra; each spectrum of the spectra is known by an order number, where zero-order represents undiffracted light, a first order is that closest in angle to undiffracted light, second order is the next spectrum beyond first order, etc. It is known that high order spectra may overlap—for example but not limitation the same diffraction angle may result with a first wavelength diffracted sixth order and a second wavelength diffracted fifth order.

Embodiments herein described improve on the spatial heterodyne spectrometer ("SHS") of FIG. 1 by increasing spectral coverage; these embodiments are multiband spatial heterodyne spectrometers (MSHS). Embodiments herein also function as imaging spectrometers.

Figure 2:
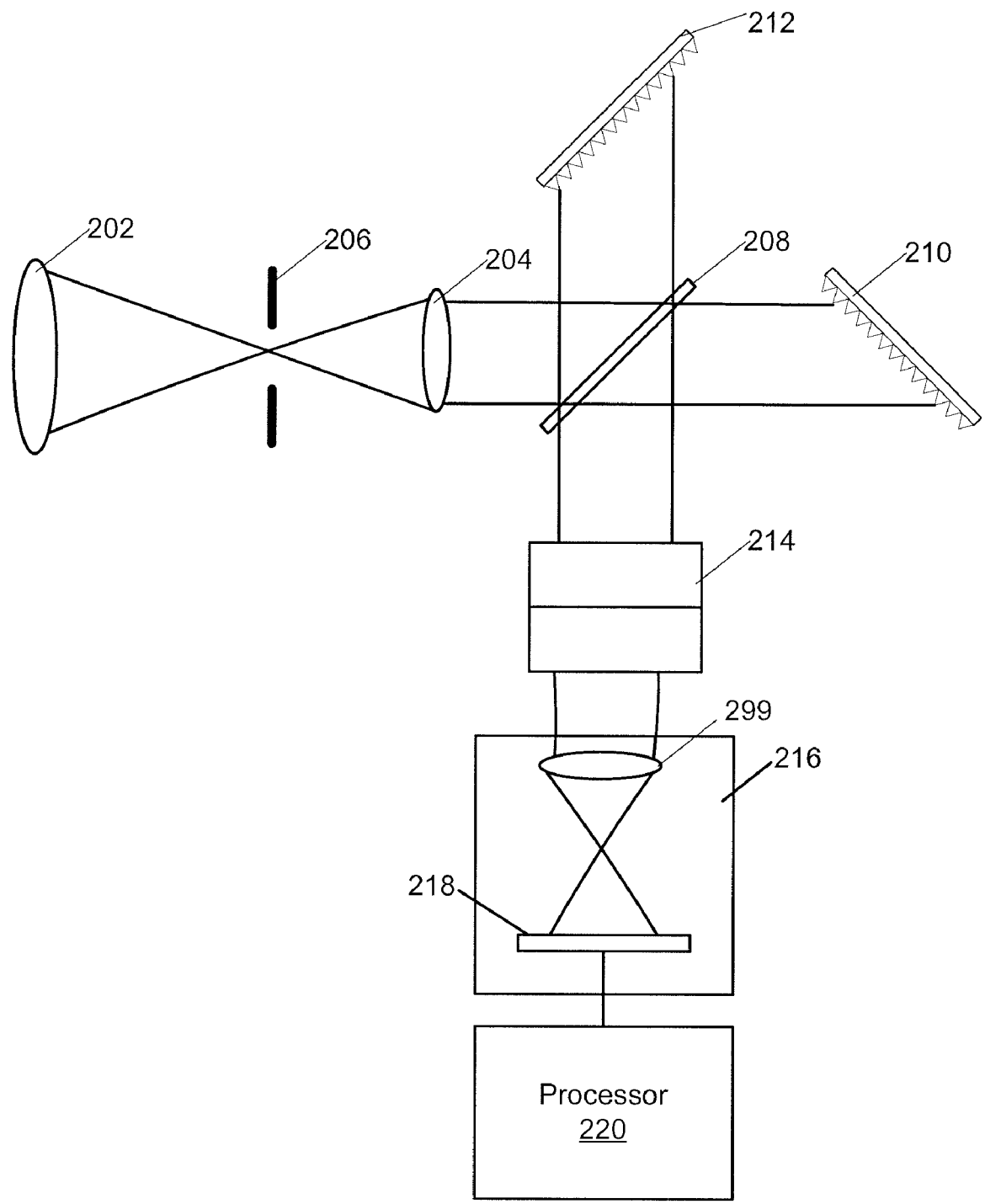
FIG. 2 is a block diagram of a multiband spatial heterodyne spectrometer viewed in a first axis.
Figure 3:
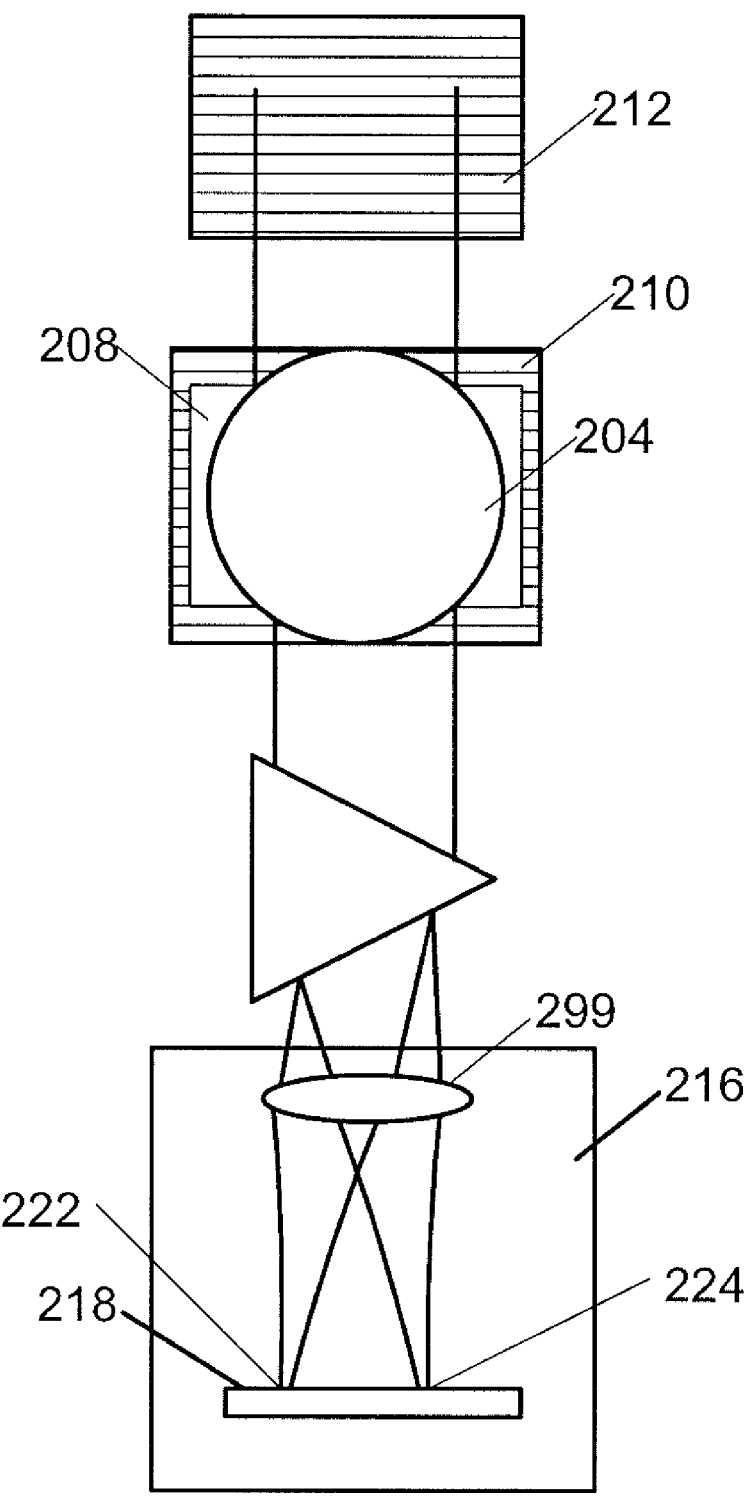
FIG. 3 is a block diagram of the multiband spatial heterodyne spectrometer of FIG. 2 but rotated 90 degrees with respect to FIG. 2.
Figure 4:
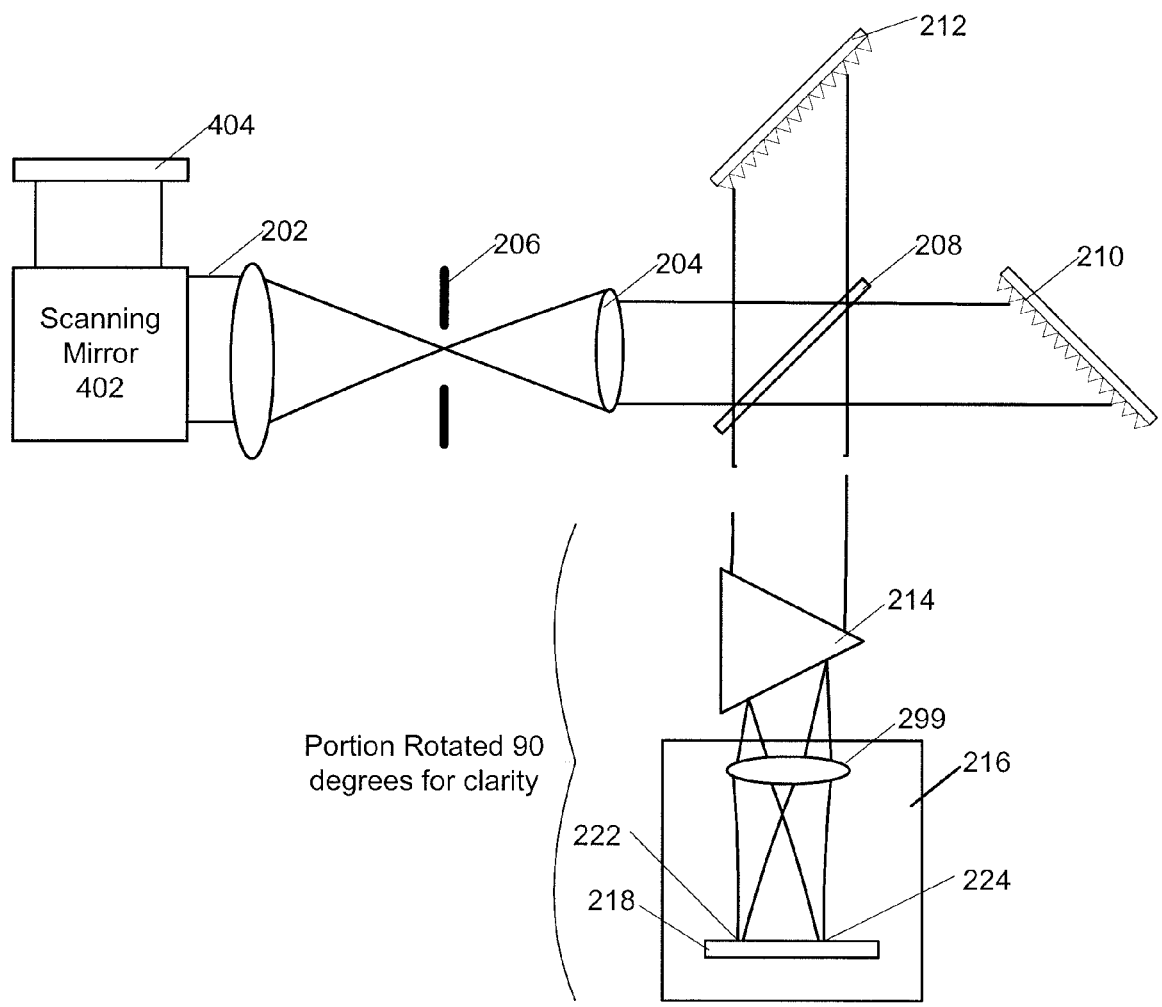
FIG. 4 is a block diagram of an imaging multiband spatial heterodyne spectrometer.

In an embodiment of the MSHS, as illustrated in FIGS. 2, 3, and 4, light enters through a focusing and aperture system which may have lenses 202, 204 and an aperture 206, or may use mirrors (not shown). Mirrors are particularly useful in very high bandwidth embodiments because they are not as wavelength-dependent as lenses.

The light impinges upon a beam splitter 208. A portion of the light passes through beam splitter 208 and is reflected by a first diffraction grating 210. A second portion of the light is reflected by beam splitter 208 and is reflected by a second diffraction grating 212. A portion of light from the first diffraction grating 210 is reflected by the beam splitter 208 through an interference zone and thence into a prism 214, a cylinder lens, a spherical lens and thence into an electronic camera 216. Prism 214 may be located before or after the imaged interference zone.

A portion of light from the second diffraction grating 212 passes through beam splitter 208 through the interference zone and prism 214 into the electronic camera 216. Since the light from first grating 210 and second grating 212 have differing wavefront angles, and these wavefront angles vary with wavelength because of wavelength-dependent diffraction by the gratings 210, 212, interference patterns form in the interference zone. Camera 216 provides an image of the interference patterns on a detector 218 having either multiple linear arrays of pixel sensors or, in a preferred embodiment, a two dimensional array of pixel sensors.

The MSHS of FIGS. 2 and 3 has diffraction gratings 210, 212 such that of a first band of interest is returned by those gratings to the beam splitter 208 when diffracted through a first order N (where N is typically not one), and that a second band of interest is returned by those gratings 210, 212 to the beam splitter 208 when diffracted according through a second order N+M, where M is an integer. Light in each of these bands forms an essentially separate diffraction pattern, light in the first band forming a first pattern, light in the second band forming a second pattern. The MSHS may be configured such that light in additional bands of interest is also returned to beam splitter 208 when diffracted according to different orders, light of each order forming a diffraction pattern.

In a particular embodiment, the first order N is in the range 10 to 200, in another embodiment N is in the range 20 to 400.

Each band of interest has a center wavelength for Littrow refraction given by the grating equation $2\sigma o \sin \theta L = n/d$ (1) where $\theta L$ is the angle the gratings are inclined to the optical axis, n is the grating order and 1/d is the grating groove density.

One or more prisms 214 are configured at right angles to the first and second interference patterns, to disambiguate these patterns—without prism 214 the patterns overlap on the detector 218. In consequence, the first pattern from the first band is imaged 502 (FIG. 5) by electronic camera 216 on a first row 222 of pixel sensors of detector 218 and the second pattern is imaged 504 by electronic camera 216 on a second row 224 of pixel sensors of detector 218; in an embodiment detector 218 has a two dimensional array of pixel sensors. Additional spectra 506 corresponding to additional bands may also be imaged on the detector 218.

In an alternative embodiment, an additional diffraction grating is used for disambiguation in place of prism 214. Similarly, rows and columns of pixel sensors of the detector 218 may be interchanged such that the first pattern is imaged by a first column of pixel sensors of detector 218 instead of a first row—what is expected is that a first group of pixel sensors in a first region of detector 218 receive the first pattern and a second group in a second region of detector 218 receive the second pattern, and that the first and second group are distinct and nonoverlapping. For simplicity, a linear arrangement of pixel sensors exposed to a diffraction pattern is referred to as a row of pixel sensors. Pixel sensors of detector 218 may be fabricated from Indium Gallium Arsenide, Silicon, or of such other semiconductor materials as are used in the ultraviolet, visible light, and infrared imaging art. Detector 218 may be a composite detector having rows of pixel sensors of differing types. For example, a row of Mercury Cadmium Telluride (MCT) sensors may be parallel to a row of silicon PIN sensors to provide appropriate sensitivity for detecting spectra imaged on each row of sensors.

Digital processor 220 is configured to receive data from the first and second groups of pixel sensors of detector 218, and transforms each of these patterns to provide a spectrum of light in each of the first and second band of wavelengths.

While the spectrometer of FIG. 2 may be operated to analyze spectra from point or slit sources, in a particular embodiment, the spectrometer of FIG. 4 is coupled to receive light from scanning mirrors 402 adapted to scan a field of view through a window 404. In this embodiment, the processor 220 constructs hyperspectral images based upon the spectra determined from the interference patterns; this embodiment operates as an imaging spectrometer.

The multiband spatial heterodyne spectrometer ("MSHS") of FIG. 2 therefore utilizes low spatial frequency, high order gratings in the spectrometer path, and utilizes a prism to eliminate order mixing. The multiband spatial heterodyne spectrometer may also be called a multiple order spatial heterodyne spectrometer.

A particular embodiment of the MSHS images a slit plane in one of two orthogonal directions using anamorphic lenses 299 in camera 216 instead of the spherical lenses typically used in SHS spectrometers; these lenses may be cylindrical lenses, or may be a combination of spherical and cylindrical lenses, or may be lenses ground or molded to have both spherical and cylindrical properties.

A cylindrical lens focuses light from the slit in one orthogonal direction only. This means that, in that embodiment, a series of interferograms associated with different positions within the slit as well as interferograms associated with different orders are projected upon detector 218. The interferogram associated with each order has finite spatial extent perpendicular to the spread of fringes (Fourier direction) 512. Within each order, this perpendicular direction (spatial direction) 510 (FIG. 5) contains information about different spatial locations along the length of the slit. In an alternative imaging embodiment of the MSHS, the interferogram associated with each order is arranged to fall on multiple rows 514 of pixel sensors of detector 218.

When a device performs a separate one-dimensional Fourier transform on each row of pixel sensors in the interferogram individually, the device retains spatial content in one direction while producing spectral information in the Fourier direction. The device therefore can obtain spectra at several orders for each of several locations across an illuminated slit simultaneously.

In this alternative embodiment, scanning mirror 402 need scan only, for example and not limitation, horizontally while vertical image information is obtained by imaging a full vertical stripe on a vertical slit aperture 206. In other embodiments, scanning mirror 402 scans vertically while a full horizontal stripe of the field of view is imaged on a horizontal slit aperture 206.

An embodiment of the MSHS allows for a narrow free-spectral range of any individual order, while allowing for extended wavelength coverage by imaging multiple orders onto a detector. This helps to minimize system noise, as shot noise is directly proportional to the free spectral range. Free spectral range ("FSR") is the difference between the longest and shortest wavelength passed by any given order, n. The FSR is approximately equal to the central wavelength in the order, lambda, divided by the order number, n. In order to reduce the FSR, the MSHS is configured to operate in a high order (e.g., 30 to 200). This is achieved by providing the MSHS with a pair of echelle gratings in each arm and cross dispersing with a prism, as stated above. Furthermore multiple orders are imaged simultaneously in order to obtain wide wavelength coverage with the instrument.

It is also possible to couple an MSHS with a tunable spectral filter such as a Fabry-Perot ("FP") etalon to image discrete, non-contiguous regions of spectral space at very high resolution, and with low noise. This would be done by using the FP to pick out small regions of an individual order, to minimize the shot noise due to extraneous radiation from the rest of the order. The FP would set FSR, and the MSHS would set resolution.

Figure 5:
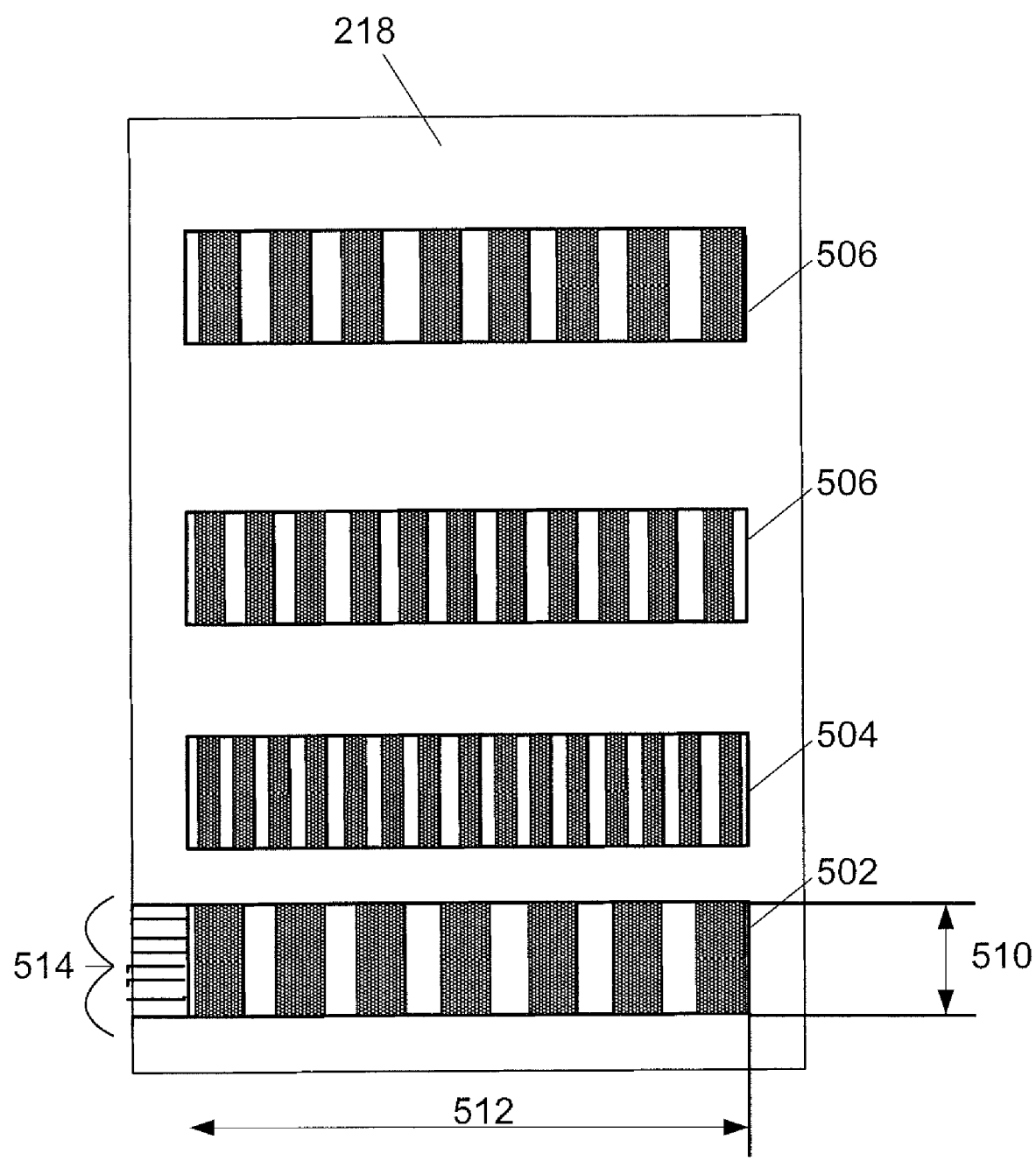
FIG. 5 illustrates multiple spectra corresponding to different bands projected on a detector of the spectrometer of FIG. 2.

Typical prior art SHS devices examine a single region of a spectrum. Our new MSHS allows measurement of multiple discontinuous regions of spectra by independently measuring the interference pattern from two or more grating orders representing two or more separate wavelength bands, as shown in FIG. 5. These regions of spectra may or may not be adjacent. The MSHS includes a post-dispersing prism after the beam-splitter to separate out on the detector the interference patterns from different orders of the grating corresponding to different bands. In other embodiments the prism disperses prior to the SHS assembly.

Data obtained from the herein described MSHS not only have the advantages of hyperspectral imaging, but may be able to identify quantities of particular elements or compounds in absorption or emission spectra of targets. For example, upon impact of a ballistic missile warhead with a kinetic kill projectile, a quantity of hot gas is produced that has emission spectra. An imaging MSHS spectrophotometer is expected to be able to determine constituent elements of the warhead sufficient to distinguish a destroyed warhead from a destroyed decoy by identifying emission and absorption spectra from plutonium and/or uranium ions in the hot gas.

In another embodiment images obtained from the herein described MSHS identify quantities of hydroxyl (OH—) ions in absorption or emission spectra of portions of the atmosphere, thereby remotely measuring humidity.

The imaging MSHS spectrophotometer herein described is capable of imaging occurrence of particular ionic atomic or molecular species in a field of view by recognizing absorption or emission spectra of those species at each of several positions in a stripe, and recording these occurrences as the stripe is swept across the field of view. Each of those positions in a stripe corresponds to pixels in the computed image.

Figure 6:
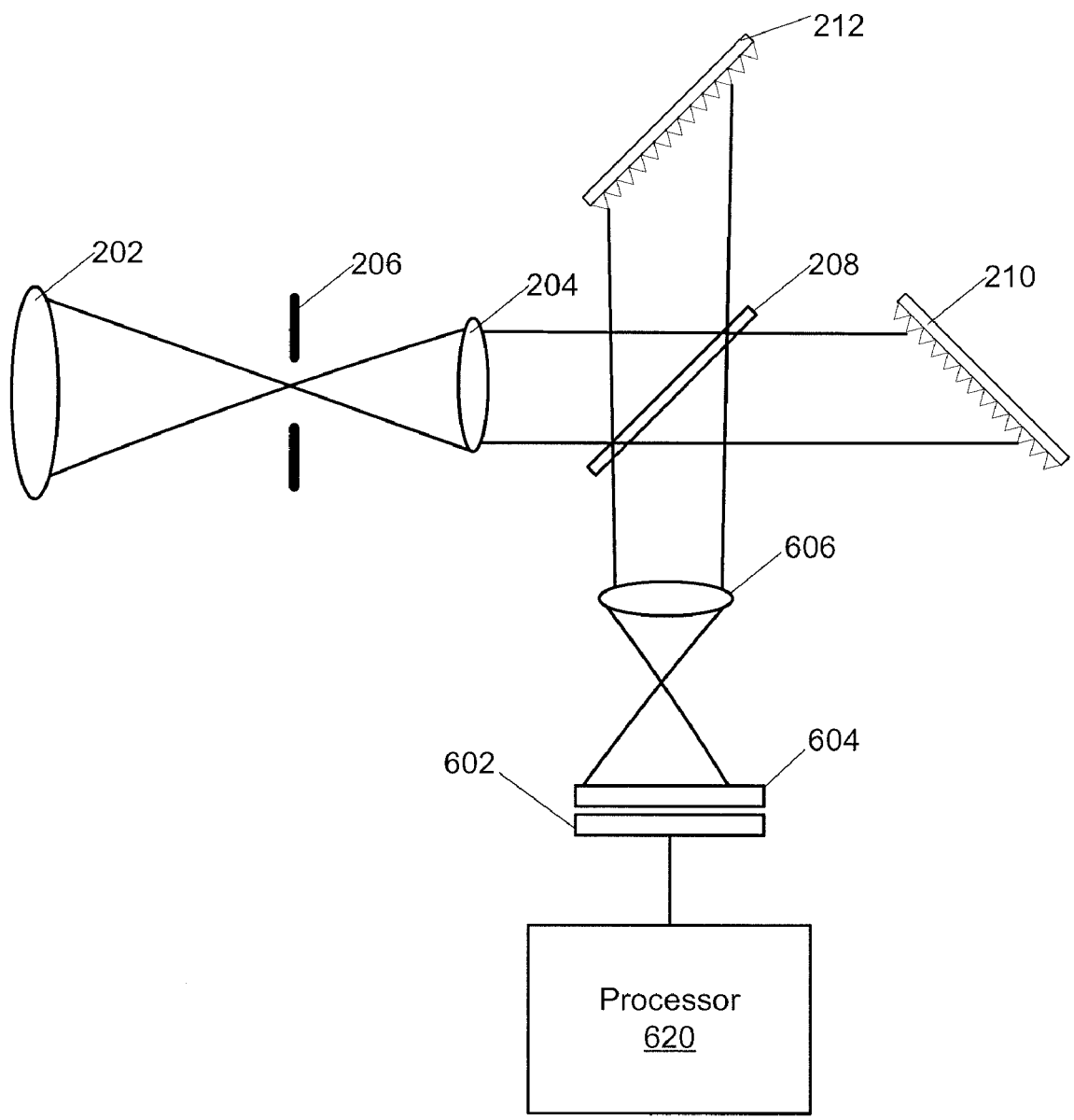
FIG. 6 illustrates an embodiment wherein disambiguation is performed by layering a short-wavelength-sensitive photodetector array upon a long-wavelength-sensitive photodetector array.

In an alternative embodiment, as illustrated in FIG. 6, the MSHS has a front end similar to that illustrated in FIGS. 2, 3, and 4; the common portion components are described with reference to FIGS. 2, 3, and 4. Instead of a prism a multilayer photodetector 602, 604 is used. The photodetector has a bottom layer 602 that has an array of pixel sensor elements sensitive in the infrared. Bottom layer 602 is overlain by an upper layer 604 having pixel sensor elements sensitive to shorter wavelengths, such as visible light, and transparent to longer wavelengths such as infrared. Such sensor elements may be fabricated from mercury cadmium telluride MCT or other materials known in the photosensor art.

Anamoiphic lens 606 focuses an image of the interference patterns generated in at least a first and a second band upon the pixel sensor elements 602, 604; upper short wavelength sensitive layer 604 responding to the pattern in the first band, and lower long-wavelength-sensitive layer 602 responding to the pattern of the second band. Processor 620 receives images from both sets of pixel sensor elements and processes the images received by pixel sensor element layers 602 and 604 separately. Once the spectra have been determined for each band separately, a composite hyperspectral image may be constructed. The embodiment of FIG. 6 is particularly adapted to imaging spectrometers.

Figure 7:
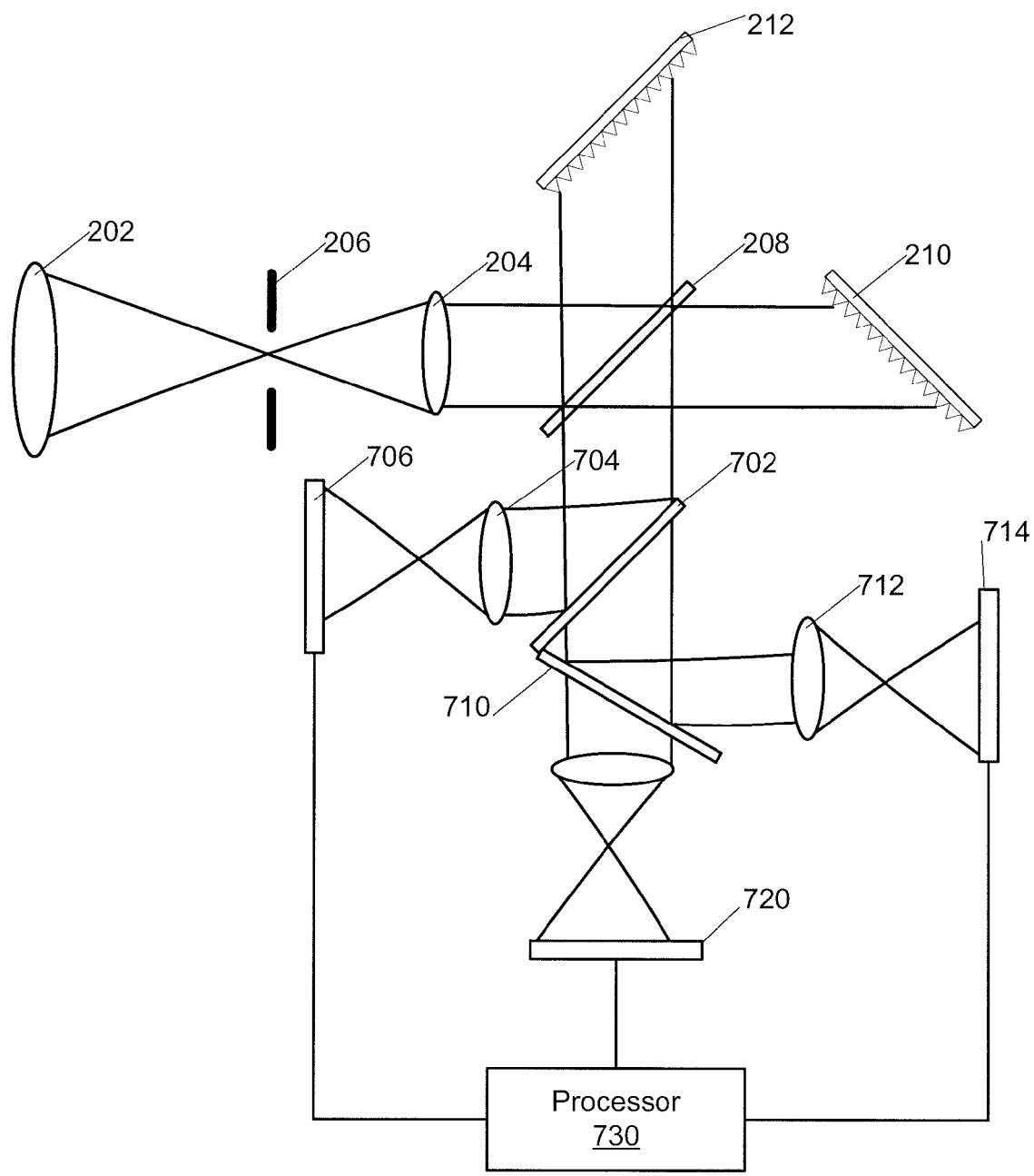
FIG. 7 illustrates an embodiment wherein disambiguation is performed by dichroic filters.

In yet another embodiment, as illustrated in FIG. 7, disambiguation is performed by a series of dichroic filters. In this embodiment, a first dichroic filter 702 is reflective to light of a first band, and transparent to a second and third band. In this embodiment, light of the first band is reflected through lens 704 and the interference pattern for this band is focused on a first photodetector cell array 706. Similarly, second filter 710 filter is transparent to the third band and reflective to the second band, in this embodiment the second band is reflected by filter 710 and focused by lens 712 on second photodetector cell array 714. Light of the third band passes through both filters 710, 702 and focused on photodetector cell array 720. Information from all three photodetectors 706, 714, 720 is fed to processor 730 for processing as heretofore described.

Figure 8:
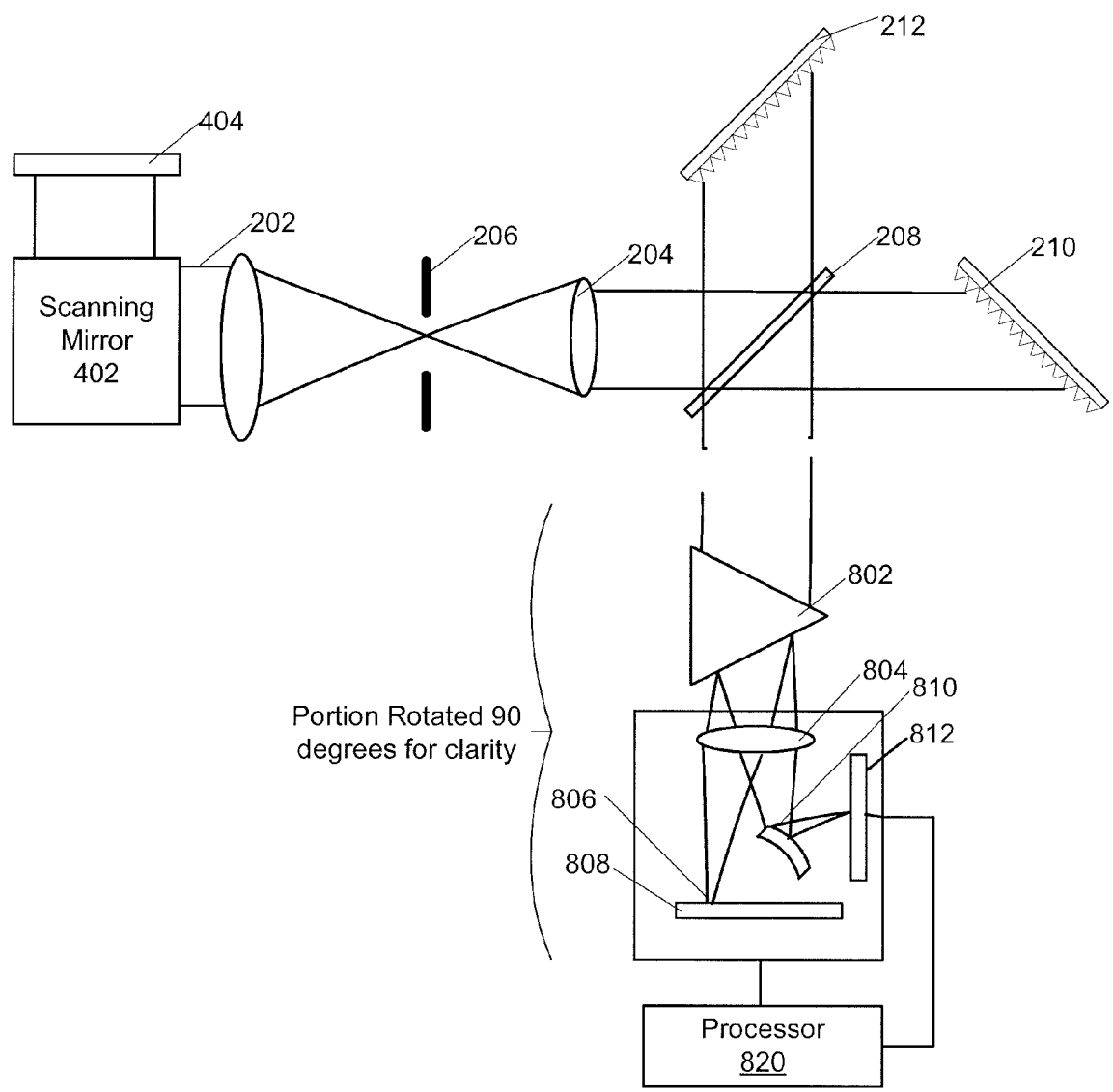
FIG. 8 illustrates an embodiment wherein disambiguation is by a dispersive device, and wherein there are separate detectors for some bands of the instrument.

In yet another embodiment, as illustrated in FIG. 8, disambiguation is performed by a prism 802. Light of a first band is focused by lens 804 onto a first location 806 of a first detector 808. Light of a second band is intercepted by mirror 810 and focused on a second detector 812. Mirror 810 may be flat, or may be curved to provide appropriate focus. Information from both detectors 808, 812, is processed by processor 820 to determine spectra in each band.

In the embodiment of FIGS. 2, 3, and 4 as heretofore described, gratings 210 and 212 may be fixed into position; and may be fabricated as a monolithic device. In an alternate embodiment, gratings 210 and 212 are rotatably mounted on mountings that rotate synchronously. In this tunable alternative embodiment, the center wavelengths of the bands are adjustable by rotation of the gratings.

In the embodiment of FIGS. 2, 3, and 4 as heretofore described, gratings 210 and 212 have the same grating ruling linespacing, or pitch. In an alternate embodiment these gratings have differing pitch and therefore operate in different orders for Littrow reflection to occur in each grating at the same wavelength bands.

The MSHS is adaptable for operation in the infrared, visible, or ultraviolet regions of the electromagnetic radiation spectrum. In particular, the first and second wavelength bands may be in the same or different regions of electromagnetic radiation—in one embodiment visible and infrared bands are used, in another visible and ultraviolet, in yet another two bands in visible are used. In another embodiment, multiple bands in each of two or more regions of electromagnetic radiation spectrum are used.

The changes described above, and others, may be made in the multiband spatial heterodyne spectrometer described herein without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A multiband spatial heterodyne spectrometer for determining spectra of incident light in at least a first and a second wavelength band comprising:
    a beam splitter configured to split incident light and to direct the incident light upon a first and a second diffraction grating, wherein the first diffraction grating is configured for Littrow reflection of incident light of the first wavelength band at least one first order and Littrow reflection of incident light of the second wavelength band at least one second order, wherein the second diffraction grating is configured for Littrow reflection of light of the first wavelength band at the first order and of the second wavelength band at the second order, and wherein light reflected by the first and the second diffraction grating forms interference patterns;
    an electronic camera for imaging the interference patterns, the camera comprising a detector having at least two rows of pixel sensors;
    a dispersive device selected from the group consisting of a prism and a diffraction grating for separating the interference patterns into interference patterns corresponding to the first and second wavelength bands;
    at least one anamorphic lens for imaging the interference patterns corresponding to the first and second wavelength bands a series of interferograms associated with different positions within the incident light on separate ones of the rows of pixel sensors; and
    a processing device coupled to receive information from the detector and to compute spectra therefrom.

2. The multiband spatial heterodyne spectrometer for determining spectra of claim 1 wherein the dispersive device is a prism.

3. The multiband spatial heterodyne spectrometer for determining spectra of claim 1 wherein the dispersive device is a third diffraction grating.

4. The multiband spatial heterodyne spectrometer of claim 1 wherein the first order is in the range 10 to 400.

5. The multiband spatial heterodyne spectrometer of claim 1 further comprising a scanning mirror, and wherein the processing device constructs a hyperspectral image from the spectra.

6. The multiband spatial heterodyne spectrometer of claim 5 wherein light from a stripe of a field of view is focused through an aperture, where at least one interference pattern corresponding to incident light of a wavelength band is focused upon a plurality of rows of pixel sensors, and wherein data from the plurality of rows of pixel sensors encodes positional information within the stripe of the field of view.

7. The multiband spatial heterodyne spectrometer of claim 5 wherein the first wavelength band is in the infrared and the second wavelength band is in the visible.

8. The multiband spatial heterodyne spectrometer of claim 1 wherein the first wavelength band is in the infrared and the second wavelength band is in the visible.

9. The multiband spatial heterodyne spectrometer of claim 1 wherein the processing device is adapted to recognize emission spectra from Uranium and Plutonium.

10. The multiband spatial heterodyne spectrometer of claim 1 wherein the spectrometer is tunable by adjustment of angles of the first and the second diffraction gratings.

11. A multiband spatial heterodyne imaging device comprising:
    a beam splitter configured to split light received from an aperture and to direct the light upon a first and a second diffraction grating, wherein each of the first and second diffraction grating is configured for Littrow reflection of incident light of a first wavelength band at a first order, the first order not being one, and Littrow reflection of incident light of a second wavelength band at a second order, and wherein light reflected by the first and the second diffraction grating forms interference patterns;
    an electronic camera for imaging the interference patterns, the camera comprising a detector having rows of pixel sensors;
    a dispersive device selected from the group consisting of a prism and a diffraction grating for separating the interference patterns into interference patterns corresponding to the first and second wavelength bands;
    at least one anamorphic lens for imaging the interference patterns corresponding to the first and second wavelength bands a series of interferograms associated with different positions within the incident light on separate ones of the rows of pixel sensors;
    wherein data from the plurality of rows of pixel sensors encodes positional information within the stripe of the field of view; and
    a processing device coupled to receive information from the detector and to compute images therefrom.

12. The multiband spatial heterodyne imaging device of claim 11 wherein the processing device is configured to image occurrence of particular molecular species in a field of view.

13. The multiband spatial heterodyne imaging device of claim 11 further comprising a lens for collecting light into the aperture.

14. The multiband spatial heterodyne imaging device of claim 11 wherein each of the at least one anamorphic lens is a cylindrical lens.

15. The multiband spatial heterodyne imaging device of claim 11, further comprising a scanning device for scanning stripes of a field of view across the aperture.

16. A multiband spatial heterodyne spectrometer for determining spectra of incident light in at least a first and a second wavelength band comprising:
    a beam splitter configured to split incident light and to direct the incident light upon a first and a second diffraction grating, wherein each of the first and second diffraction grating is configured for Littrow reflection of incident light of the first wavelength band at a first order and Littrow reflection of incident light of the second wavelength band at a second order, and wherein light reflected by the first and the second diffraction grating forms interference patterns;

an electronic camera for imaging the interference patterns, the camera comprising a first and a second detector each having at least one row of pixel sensors;

at least one dichroic filter for separating the interference patterns into interference patterns corresponding to the first and second wavelength bands, wherein the interference pattern corresponding to the first wavelength band is focused upon the first detector, and the interference pattern corresponding to the second wavelength band is focused upon the second detector; and a processing device coupled to receive information from the first and second detectors and to compute spectra therefrom.

17. The multiband spatial heterodyne spectrometer of claim 16 wherein the first detector has spectral sensitivity differing from a spectral sensitivity of the second detector.

18. A multiband spatial heterodyne spectrometer for determining spectra of incident light in at least a first and a second wavelength band comprising:

a beam splitter configured to split incident light and to direct the incident light upon a first and a second diffraction grating, wherein the first diffraction grating is configured for Littrow reflection of incident light of the first wavelength band at a first order and Littrow reflection of incident light of the second wavelength band at a second order, wherein the second diffraction grating is configured for Littrow reflection of light of the first band at a third order, and wherein light reflected by the first and the second diffraction grating forms interference patterns;

an electronic camera for imaging the interference patterns, the camera comprising a detector having at least two rows of pixel sensors;

a dispersive device selected from the group consisting of a prism and a diffraction grating for separating the interference patterns into interference patterns corresponding to the first and second wavelength bands on separate rows of pixel sensors; and a processing device coupled to receive information from the detector and to compute spectra therefrom.

* * * * *